May 8, 1951 U. LILLARD 2,552,289
BRAKE CONTROL MECHANISM
Filed Aug. 11, 1950 2 Sheets-Sheet 1
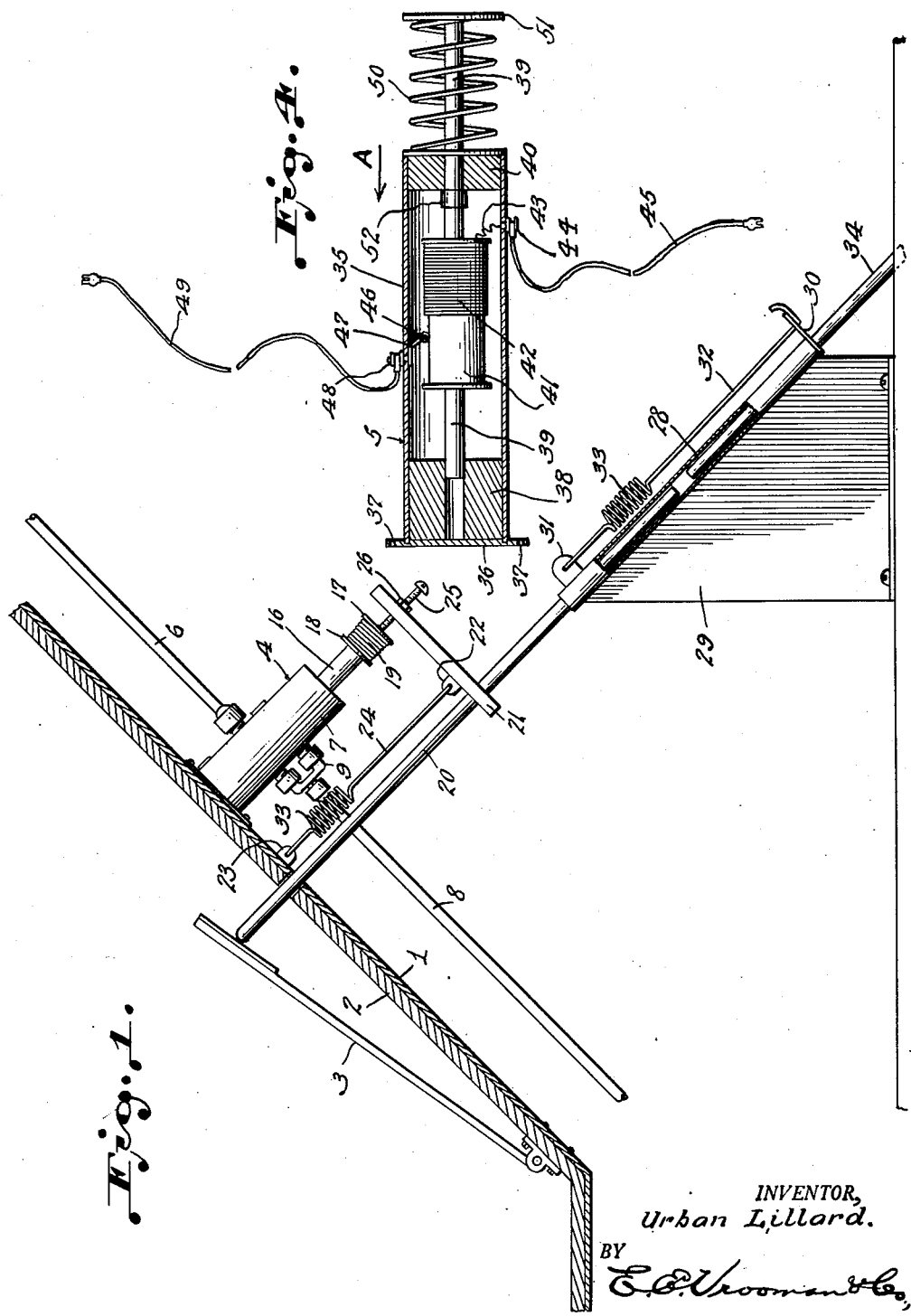
INVENTOR,
Urban Lillard.
BY
ATTORNEYS.

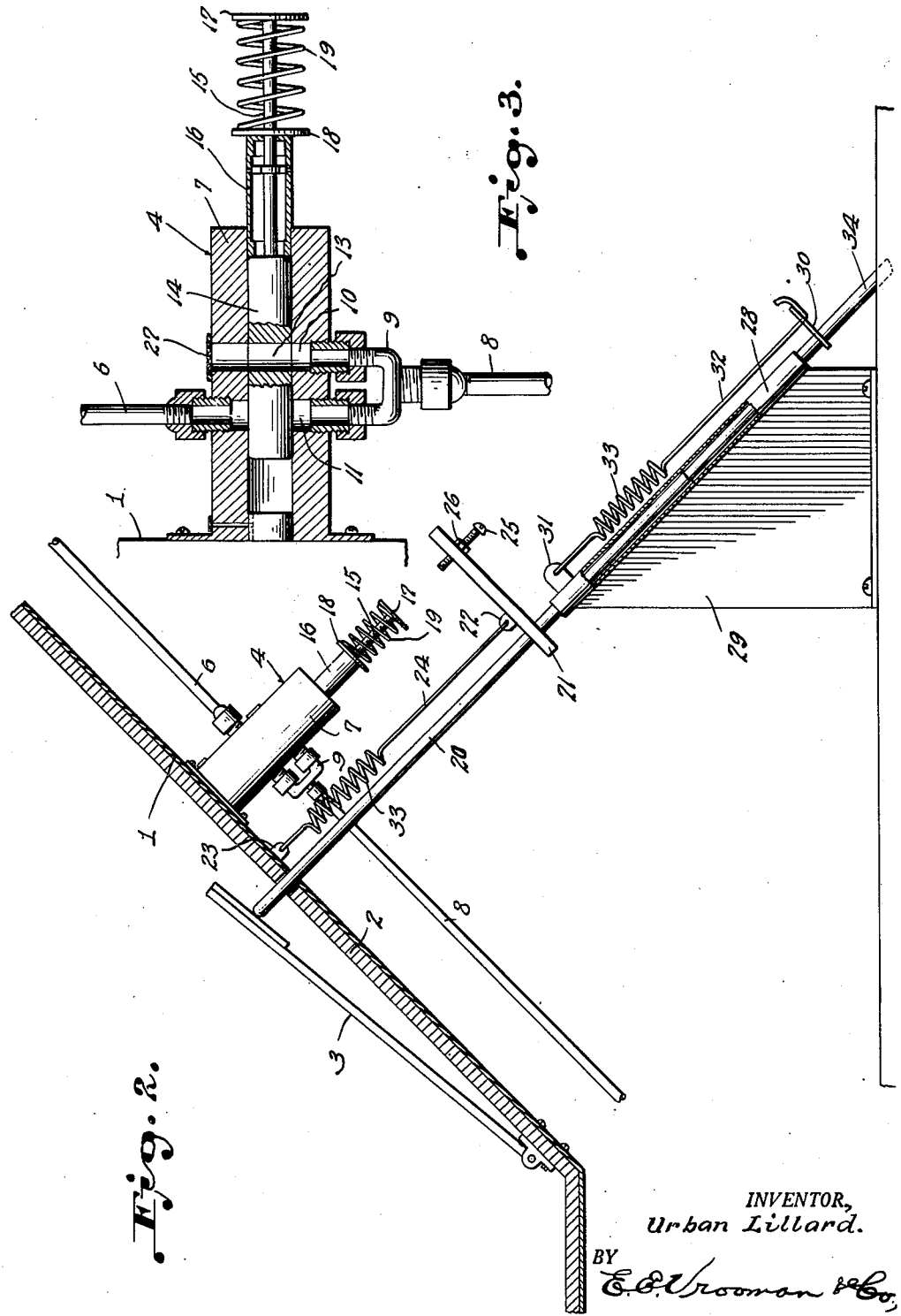

Patented May 8, 1951

2,552,289

UNITED STATES PATENT OFFICE 2,552,289

BRAKE CONTROL MECHANISM

Urban Lillard, Hollywood, Fla.

Application August 11, 1950, Serial No. 178,910

3 Claims. (Cl. 192—3)

This invention relates to a brake control mechanism.

An object of this invention is to provide efficient means, operated by the accelerator pedal, to easily control applying the brakes of a motor vehicle, or for controlling the release of the brakes after they have been applied.

This invention is intended primarily for use on automobiles, trucks, busses, etc., having automatic clutch and transmission, and it is believed it will be quite practical when used in vehicles having conventional clutch and transmission. Advantages of this invention can readily be seen when considering the difficulty of operating a motor vehicle when forced to stop on an upgrade, or the inconvenience of transferring attention from the accelerator pedal to the brake pedal when driving in congested traffic.

With the foregoing and other objects in view, this invention comprises certain novel constructions, combinations, and arrangements of parts as will be hereinafter fully described, illustrated in the accompanying drawings, and more particularly pointed out in the appended claims.

In the drawings:

Figure 1 is a view partly in elevation and partly in section of a brake control mechanism constructed in accordance with the present invention.

Figure 2 is a view similar to Figure 1 showing the mechanism as it appears when the motor vehicle is running or traveling over the roadway.

Figure 3 is an enlarged fragmentary vertical sectional view of the mechanism, showing particularly the valve device thereof.

Figure 4 is a vertical longitudinal sectional view of the rheostat device which may be substituted in place of the valve device of this mechanism.

Referring to the drawings, in which the preferred embodiment of the invention is illustrated in Figures 1 to 3, 1 designates a floor board and 2 is the floor mat thereon. An accelerator pedal 3 is pivotally mounted at 4 upon the floor mat and floor board.

A valve device 4 is fastened to the under face of the floor board 1 and will be hereinafter specifically described. This valve device 4 constitutes broadly controlling means. The rheostat device 5 in Figure 4, also constitutes controlling means.

A pipe 6 is in communication with the interior of valve casing 7, and this pipe 6 is a power source of the mechanism. A pipe 8 is the means of connecting the mechanism to the brake operating mechanism (not shown). Pipe 8 is in communication with a two-way pipe 9, Fig. 3. One of the branches of pipe 9 opens into the channel 10 of the valve casing 7. The other branch of the pipe 9 opens into the channel 11 of valve casing 7. The power source pipe 6 is adapted to discharge into channel 11 when the passage 13 of the valve 14 registers therewith. In Figure 3 the valve 14 is shown in a closed position, with no power being supplied thereto by means of pipe 6. The valve 14 is fixed to a plunger 15. Plunger 15 extends through sleeve 16, which sleeve is secured in the end of the valve casing 7. The plunger 15 extends beyond the sleeve 16 and has on its outer end a fixed disc 17. Another disc 18 is against the outer end of the sleeve 16, and on plunger 15 is a coil spring 19; spring 19 is between the disc 17 and disc 18.

A brake and carburetor rod 20 is slidably mounted in the floor board 1 and floor mat 2 and bears at its outer end against the under face of the accelerator pedal 3. On the rod 20 is fixed an arm 21. A lug 22 is secured to the inner face of the arm 21, and a lug 23 is secured to the under face of floor board 1. A primary return spring 24 is fastened at one end to lug 22 and at its other end to lug 23. An adjusting screw 25 is mounted on arm 21, and on this screw 25 is a nut 26 that acts to lock the screw 25 in an adjusted position upon arm 21. The inner end of screw 25 is adapted to press against disc 17 and thereby force valve 14 inwardly to cause the channel or port 13 to register with the power source 6 whereupon the brakes will be applied. When the operator presses upon pedal 3 the screw 25 will move away from disc 17, as shown in Figure 2, whereupon the spring 19 will cause the valve 14 to take the position shown in Figure 3, that will result in the power contained in pipe 8 to be exhausted at 27, Figure 3.

The rod 20 is slidably mounted in a tube 28, which tube is fixedly mounted on bracket 29. Bracket 29 is suitably mounted on the frame or chassis of a motor vehicle. On the rod 34 is a return stop 30, which is fixedly secured to said rod. A stud 31 is fastened near the upper end of pipe or tube 28, and an auxiliary spring 32 is mounted on stop 30 and stud 31. This spring 32, like spring 24, is provided with a coil 33. The spring 24 is stronger than the coil spring 19 or coil spring 50.

From the foregoing it will be apparent that when the pressure on the accelerator pedal 3 is released to the point of engine idling speed, the brake and carburetor rod 20 disengages from the carburetor operating rod 34 and further releases of pressure control only the extent of power used in application of the brakes. As shown in the drawings the carburetor operating rod 34 is drawn upwardly when pressure is released on the accelerator pedal 3 by return spring 32. This upward movement is arrested at the point of engine idling speed by the return stop 30 coming in contact with the lower end of tube 28, while the rod 20 disengages from operating rod 34 and continues to be drawn upwardly on further release of foot pressure, by return spring 24. It is to be understood that there are two rods 20 and 34 that have their inner ends in tube 28.

The rheostat 5 (Fig. 4) consists of a tube 35, with a flanged base 36 having holes 37 through which screws or bolts may be driven to secure the device to support on floor board 1. Inserted in the base end of the tube 35 is a bearing 38, having a centrally located bearing surface tubular in form to accept, guide and support shaft 39. At the upper end of tube 35 is a shorter bearing 40, but otherwise similar in construction to bearing 38. Within tube 35 and fastened on and about shaft 39 is a drum of non-conducting material 41. Wrapped around a portion of drum 41 is a coil of resistance wire 42. The end of coil 42 nearer base of tube 35 terminates in the drum 41, leaving a portion of the drum 41 bare through which no current can flow. Upper end of coil 42 terminates in an electrical connection with a length of flexible wire 43, which in turn makes electrical connection with a terminal post 44, properly insulated from tube 35 and permitting connection of the device with brake operating mechanism by means of a wire 45. Current is introduced to coil 42 by means of a roller contact 46 attached to a conductor spring 47. Spring 47 is attached to a terminal 48 which is properly insulated from tube 35, permitting connection of the device to a source of electricity by wire 49. Drum 41, coil 42, and shaft 39 are actuated by expanding spring 50 placed around shaft 39 between the inner or top end of tube 35 and retainer 51, which retainer 51 is fastened to the upper or outer end of shaft 39.

In Figure 4 the parts are shown as when the accelerator pedal 3 is depressed enough to bring the motor above idling speed. The operating arm 21 on the rod 20 has moved away from the shaft 39 allowing the spring 50 to draw the shaft 39 upward until stopped by the collar 52, contacting the bearing 40. The contact roller 46 touches only the non-conduting material of the drum 41 so that no current flows through the device. Releasing the accelerator pedal 3 would cause the action of spring 50 to be overcome and the shaft 39, drum 41 and coil 42 would be moved in the direction indicated by the arrow A. This movement would bring the roller 46 into contact with the coil 42, closing the circuit but limiting the flow of current by resistance of the coil 42. As the movement progresses because of further release of accelerator pedal 3 less and less of the coil 42 is utilized, thus increasing the flow of current and consequent pressure of the brakes.

While I have described the preferred embodiments of the invention and illustrated the same in the accompanying drawings, certain minor changes or alterations may appear to one skilled in the art to which this invention relates during the extensive manufacture of the same, and I, therefore, reserve the right to make such changes or alterations as shall fairly fall within the scope of the appended claims.

What I claim is:

1. In a mechanism of the class described, the combination with a floor board, of an accelerator pedal mounted upon said floor board, a brake rod slidably mounted on said floor board and normally bearing against said accelerator pedal, a bracket provided with a tube, one end of said rod extending into said tube, a carburetor operating rod extending into said tube and being adapted to engage said brake rod, said tube provided with a stud, said carburetor operating rod provided with a stop, a spring mounted on said stud and on said stop, said brake rod provided with a fixed arm, a stud on said fixed arm, a stud on said floor board, a spring mounted on the stud of said arm and on the stud of said floor board, controlling means mounted on said floor board, a source of power connected to said controlling means, means connected to said controlling means and also to brake means, said controlling means including a plunger, a coil spring mounted on said plunger, said arm provided with means for compressing said coil spring when said accelerator pedal is released, and said compressing means including an adjusting screw for regulating the amount of pressure to be exerted upon said coil spring.

2. In a mechanism of the class described, the combination with a floor board, of controlling means carried by said floor board, said controlling means including a tube, a slidable shaft extending into said tube, a drum in said tube and fixedly secured to said shaft, a portion of said drum being left bare and a portion of said drum provided with a coil, a roller within said tube and normally bearing upon the bare portion of said drum, means supporting said roller upon said tube, a flexible wire extending from said coil, a coil spring on said shaft outside of said tube, said shaft provided on its outer end with a retainer, said coil spring bearing at its outer end against said retainer, an accelerator pedal secured to said floor board, and means cooperating with said accelerator pedal and said retainer for pressing upon said retainer and actuating said shaft when pressure is removed from said accelerator pedal to permit said pedal to rest in an inactive position.

3. In a mechanism of the class described, the combination with a floor board, of an accelerator pedal mounted upon said floor board, a brake rod mounted on said floor board and normally bearing against said accelerator pedal, a tube, one end of said rod extending into said tube, a carburetor operating rod extending into said tube and being adapted to engage said brake rod, said tube provided with spring attaching means, said carburetor operating rod provided with a stop, a spring mounted on said spring attaching means and on said stop, said brake rod provided with a fixed arm, spring attaching means on said fixed arm, spring attaching means on said floor board, a spring mounted on the spring attaching means of said arm and on the spring attaching means of said floor board, controlling means mounted on said floor board, a source of power connected to said controlling means, means connected to said controlling means and also to brake means, said controlling means including a plunger, a coil spring mounted on said plunger, said arm provided with means for compressing said coil spring when said accelerator pedal is released, and said compressing means including an adjusting means for regulating the amount of pressure to be exerted upon said coil spring.

URBAN LILLARD.

REFERENCES CITED

The following references are of record in the file of this patent:

UNITED STATES PATENTS

| Number | Name | Date |
|---|---|---|
| 1,721,290 | Badertscher | July 16, 1929 |
| 1,808,182 | Shannon | June 2, 1931 |
| 1,827,104 | Perrot | Oct. 13, 1931 |
| 1,845,995 | Topp | Feb. 16, 1932 |
| 1,859,708 | Lormuller | May 24, 1932 |
| 1,964,764 | Lippert | July 3, 1934 |
| 2,148,280 | Sanford | Feb. 21, 1939 |
| 2,201,125 | Freeman | May 14, 1940 |